United States Patent [19]

Raczynski

[11] Patent Number: 4,505,637

[45] Date of Patent: Mar. 19, 1985

[54] AXIAL-FLOW CENTRIFUGAL PUMP FOR THE CIRCULATION OF FLUID

[75] Inventor: Wladyslaw Raczynski, Magency, France

[73] Assignee: Framatome & Cie, Courbevoie, France

[21] Appl. No.: 407,990

[22] Filed: Aug. 13, 1982

Related U.S. Application Data

[63] Continuation of Ser. No. 138,520, Apr. 9, 1980, abandoned.

[30] Foreign Application Priority Data

Apr. 12, 1979 [FR] France ................................ 79 09333

[51] Int. Cl.³ ............................................. F04D 29/08
[52] U.S. Cl. .................. 415/112; 415/170 A; 415/177; 415/110
[58] Field of Search ........... 415/170 A, 170 R, 172 R, 415/177, 178, 110, 111, 112

[56] References Cited

U.S. PATENT DOCUMENTS

| | | | |
|---|---|---|---|
| 2,796,027 | 6/1957 | Brown | 415/112 |
| 2,811,109 | 10/1957 | Brill et al. | 415/112 |
| 3,421,445 | 1/1969 | Ivanoff | 415/177 |
| 3,578,874 | 5/1971 | Sprouke | 415/170 A |
| 4,190,396 | 2/1980 | Tomioka et al. | 415/110 |

Primary Examiner—Stephen Marcus
Assistant Examiner—John Kwon
Attorney, Agent, or Firm—Pollock, Vande Sande & Priddy

[57] ABSTRACT

A centrifugal pump for the circulation of fluid, comprising a flow-chamber through which passes an inlet neck and which is bounded at the opposite side from the latter by a cross wall, a rotor mounted at the end of a drive shaft located in prolongation of the axis of the inlet neck, and a stator comprising an outer toroidal shroud located in prolongation of the outer shroud of the rotor, the latter being surrounded by a fixed part for connection between the end of the inlet neck and the outer shroud of the stator. The rotor is guided axially by a hydrostatic bearing consisting of a journal which is arranged on the upstream portion of the outer shroud of the rotor and cooperates with a bearing arranged on the part for connection of the stator to the inlet neck, the bearing comprising a plurality of bearing pockets placed in communication with the flow chamber and thus fed by the fluid flowing through the pump at the pressure prevailing in the flow chamber.

4 Claims, 4 Drawing Figures

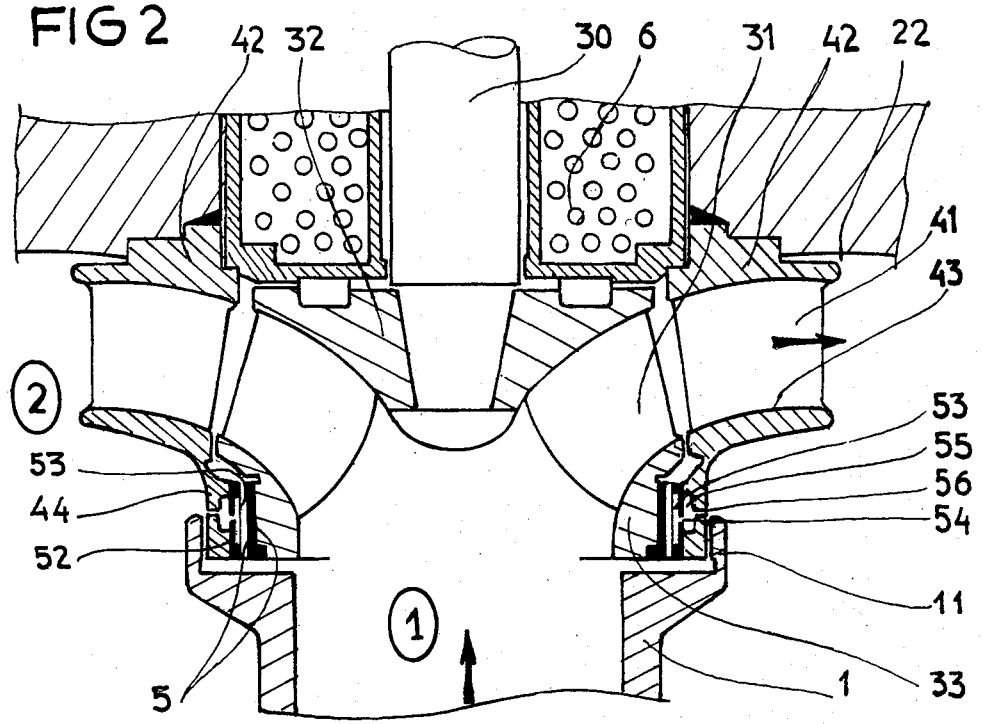
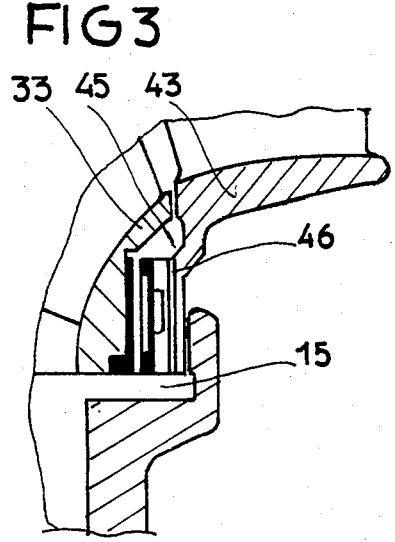
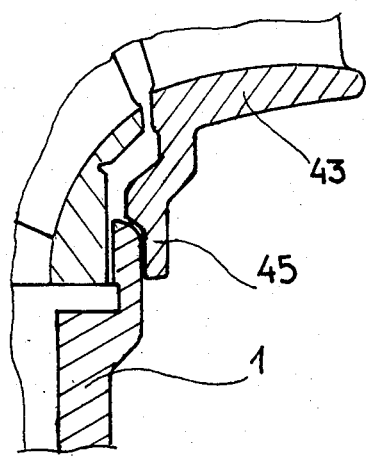

AXIAL-FLOW CENTRIFUGAL PUMP FOR THE CIRCULATION OF FLUID

This is a continuation of application Ser. No. 138,520, filed Apr. 9, 1980, abandoned.

FIELD OF THE INVENTION

The object of the invention is an axial-flow centrifugal pump for the circulation of fluid and is applicable particularly to the cooling of nuclear reactors.

BACKGROUND

Nuclear reactors are cooled by circulation of a fluid, for example water, which must be put into circulation between the reactor and steam generators. This circulation of the cooling fluid is assured by primary motor pumps which are usually of vertical-axis type and which comprise essentially a drive motor, a flywheel and the pump proper. The latter comprises a wheel forming a rotor which is fed axially by an inlet neck and which is driven in rotation inside a stator which may form an outlet diffusor which opens out inside a flow-chamber. In recent designs the flow-chamber of toroidal shape surrounds the inlet neck. The rotor located at the end of the inlet neck is mounted overhung at the end of a drive shaft which extends in prolongation of the axis of the inlet neck and passes through a cross wall which defines the flow chamber at the side opposite from the inlet neck. The rotor is composed of a plurality of blades fixed between a disc mounted at the end of the drive shaft and an outer shroud of toroidal shape, and it revolves inside a stator in the form of an outlet volute which comprises a plurality of fixed blades arranged between the cross wall of the flow-chamber and an outer toroidal shroud located in prolongation of the outer shroud of the rotor. The latter is surrounded by a cylindrical part which connects the end of the inlet neck to the stator shroud as to assure continuity of guidance of the fluid.

In general, a labyrinth seal located at the inlet to the rotor assures fluidtightness between the high pressure and low pressure portions of the pump, consisting respectively of the flow chamber and the inlet neck, the fluid tightness at the entry of the drive shaft into the flow-chamber being assured by revolving fluid tight seals of conventional type. The bottom bearing of the line of shafts, which may have three or four bearings, is normally located inside the fluid tight enclosure thus defined. Hitherto the rotor has always been mounted overhung at the end of the drive shaft, so that the distance between the bottom bearing and the center of gravity of the wheel may be more or less considerable, depending upon the type of bearing chosen.

For example, it is fairly usual in the primary pumps of pressurized-water or boiling-water reactors to employ a hydrodynamic bearing, but this bearing for satisfactory operation calls for the viscosity of the water to be kept above a certain value. On the structural plane, this obligation is expressed by the installation, between the bearing and the wheel, of the heat barrier in the form, for example, of an exchanger, which increases the overhang. In order to avoid this disadvantage, it is possible to employ a hydrostatic bearing, the operation of this type of bearing not being dependent upon the value of the viscosity of the fluid. In this case the hydrostatic bearing is located just above the rotor; the overhang which is equal to the distance between the centre of the bearing and the center of gravity of the rotor is therefore reduced but still remains considerable. On the other hand, and heat barrier which remains necessary for the protection especially of the revolving fluid tight seals is located above the hydrostatic bearing and hence is remote from the cross wall of the flow chamber.

SUMMARY OF THE INVENTION

The object of the invention is a new arrangement enabling the overhang to be reduced further and even eliminated.

In accordance with the invention the rotor is guided axially by a hydrostatic bearing consisting of a journal which is arranged on the upstream portion of the outer shroud of the rotor and cooperates with a bearing arranged on the part for connection of the upstream end of the stator to the inlet neck, the said bearing comprising a plurality of lift cells placed in communication with the flow chamber and thus fed by the fluid flowing through the pump at the pressure prevailing in the flow chamber.

The invention will now be described by referring to a particular embodiment given by way of example and shown on the attached drawings.

BRIEF DESCRIPTION OF THE DRAWINGS

FIG. 2 represents in detail the pump bearing.
FIG. 3 is a detail of a variant.
FIG. 4 is a detail of another variant.

DETAILED DESCRIPTION

Figure 1:
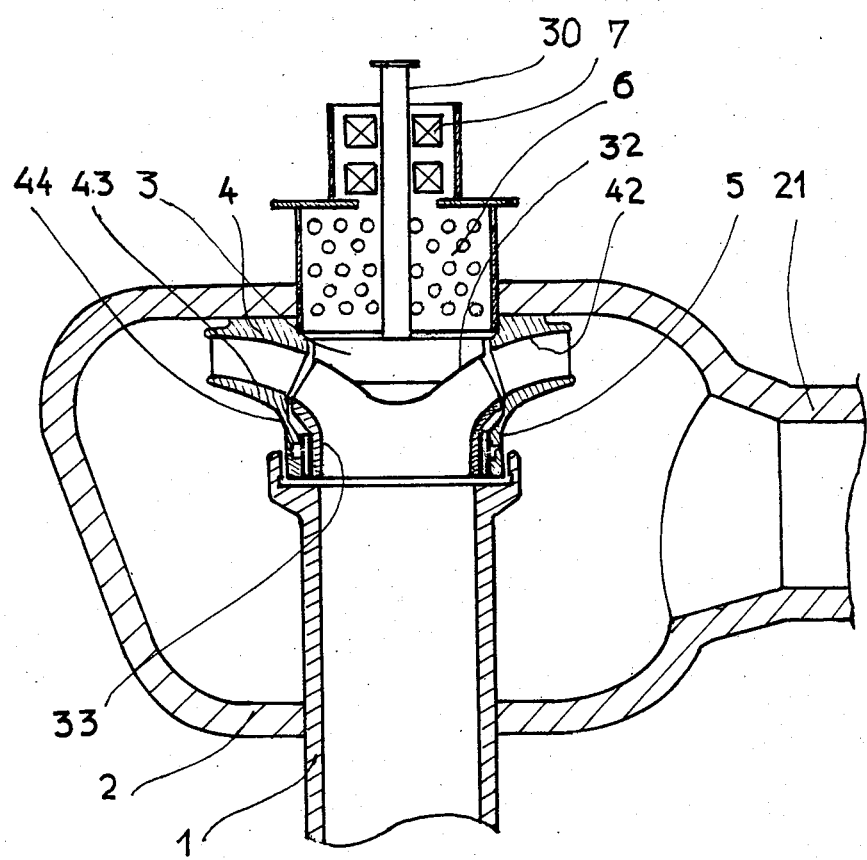
FIG. 1 is a diagrammatic elevation of the assembly of a pump in accordance with the invention.

FIG. 1 shows the assembly of a pump which has an inlet neck 1 entering along the axis of a flow chamber 2 of toroidal shape connected to an outlet neck 21. The inlet neck 1 opens out at its end into a rotor 3 which is mounted at the end of a shaft 30 connected to a motor (not shown). The rotor 3 revolves inside a stator 4 which is mounted inside the flow chamber 2 and the stator forms a volute for the outlet of the fluid put into circulation by the rotation of the rotor.

For this purpose, as shown in FIG. 2, the rotor comprises a plurality of blades 31 fixed between a disc 32 mounted overhung at the end of the shaft 30 and an outer shroud 33 of toroidal inner shape. Hence the pump is of axial-flow centrifugal type; the stream of fluid arrives axially through the inlet neck and is deflected radially towards the flow chamber 2. The guidance of the fluid at the outlet from the rotor is assured by the outlet volute 4 which comprises a plurality of fixed blades 41 mounted between a disc 42 which assures the connection between the disc 32 of the rotor and the wall 22 of the flow chamber, and an outer shroud 43 the inner face of which of toroidal shape prolongs that of the outer cheek 33 of the rotor.

Upstream the outer shroud 43 of the stator is prolonged by a substantially cylindrical part 44 which surrounds the upstream portion of the outer cheek 33 of the rotor and on the other hand provides the connection to the end of the inlet neck 1, the latter being equipped for this purpose with an adapter 11 which fits externally over the connector part 44.

In accordance with the invention, the rotor 3 is guided upstream of the shaft 30 by a hydrostatic bearing 5 consisting of a journal 51 arranged on the upstream portion of the outer shroud 33 of the rotor and on a bearing 52 arranged on the connector part 44. The bearing comprises a plurality of bearing pockets 53 which are placed in communication with the flow chamber 2. In that way the bearing pockets are fed by the fluid flowing through the pump at the pressure prevailing in the flow chamber 2, which is greater than the pressure prevailing in the inlet neck 1. Hence a leakage flow is established from the bearing, which is discharged essentially downwards, where it rejoins the low pressure zone prevailing at the inlet to the wheel. The feed of the bearing pockets may be effected directly through individual nozzles 54, but preferably the latter will open out into an internal collector 55 arranged in the connector part 44, which in turn is placed in communication with the interior of the flow chamber through an orifice 56.

The bore of the bearing and the corresponding surface of the journal may be coated with hard metals capable during the course of operation of the pump of limiting the consequences of possible direct contacts between the bearing and the journal. For example, the bearing and the journal may be of steel coated with carbides, or else with alloys having a nickel or cobalt base.

Again, in accordance with an improvement shown in FIG. 3, one may arrange in the stator between the outer shrouds 33 of the rotor and 43 of the stator an annular gap 45 which is placed in communication through ducts 46 with a corresponding annular gap 15 arranged at the end of the inlet neck upstream of the bearing. The efficacy of the bearing will thus be increased, as the flow of fluid may be discharged symmetrically upwards and downwards from the bearing because of the balancing of the pressures.

Thanks to this arrangement of the hydrostatic bearing upstream of the rotor, it is possible to locate a heat barrier 6 directly above the disc 32 of the rotor, i.e., at the height of the wall 22 of the flow chamber. The revolving fluid tight seals 7 may thus be brought close to the rotor, thereby reducing the length of the line of shafts. The heat barrier is built in a conventional way, e.g., in the form of an exchanger surrounding the shaft 30.

What is claimed is:

1. A centrifugal pump for the circulation of fluid, comprising
    (a) a flow chamber of toroidal shape surrounding an inlet neck and bounded at the side opposite from the latter by a cross wall;
    (b) a rotor mounted at the end of a drive shaft which extends, in prolongation of the axis of said inlet neck, from the outside of said cross wall, said rotor comprising a plurality of blades fixed between a disc mounted at the end of said drive shaft and an outer shroud of toroidal shape; and
    (c) a stator in the form of an outlet volute consisting of a plurality of fixed blades arranged between said cross wall and an outer shroud located in the prolongation of said outer rotor shroud and connected to the end of said inlet neck by a substantially cylindrical connector part surrounding the upstream portion of said outer rotor shroud, at the interior of which is arranged a hydrostatic bearing comprising a journal arranged on the upstream portion of said outer rotor shroud; and
    (d) a bearing arranged on said connector part and comprising a plurality of bearing pockets, each being placed in communication with the interior of said flow chamber by a feed orifice for fluid at the pressure prevailing in said flow chamber;
    (e) an annular gap being arranged downstream of the bearing between said outer shrouds of said rotor and said stator, said downstream gap being placed in communication with said inlet neck upstream of said bearing by at least one pressure-balance duct arranged in said connector part.

2. A centrifugal pump according to claim 1, wherein said feed orifices are nozzles opening out into an internal collector arranged in said connector part and in turn placed in communication with said flow chamber through at least one orifice.

3. A centrifugal pump according to claim 1, wherein said inlet neck is equipped at its end with an adapter which fits externally onto said connector part.

4. A centrifugal pump according to claim 1, wherein a heat barrier of annular shape surrounds the protion of said drive shaft which passes through said cross wall as far as the rear face of said rotor disc.

* * * * *